United States Patent
Kawahara et al.

(10) Patent No.: US 11,867,262 B2
(45) Date of Patent: Jan. 9, 2024

(54) FRICTIONAL ROLLER REDUCER

(71) Applicant: NSK LTD., Tokyo (JP)

(72) Inventors: Hiroshi Kawahara, Fujisawa (JP); Hirofumi Itagaki, Fujisawa (JP)

(73) Assignee: NSK, LTD., Tokyo (JP)

( * ) Notice: Subject to any disclaimer, the term of this patent is extended or adjusted under 35 U.S.C. 154(b) by 89 days.

(21) Appl. No.: 17/440,950

(22) PCT Filed: Jan. 10, 2020

(86) PCT No.: PCT/JP2020/000683
§ 371 (c)(1),
(2) Date: Sep. 20, 2021

(87) PCT Pub. No.: WO2020/188967
PCT Pub. Date: Sep. 24, 2020

(65) Prior Publication Data
US 2022/0221031 A1   Jul. 14, 2022

(30) Foreign Application Priority Data

Mar. 20, 2019 (JP) .................... 2019-053690

(51) Int. Cl.
*F16H 13/08* (2006.01)
*F16H 13/10* (2006.01)

(52) U.S. Cl.
CPC ............ *F16H 13/10* (2013.01); *F16H 13/08* (2013.01)

(58) Field of Classification Search
CPC ........... F16H 13/10; F16H 13/08; F16H 13/06
See application file for complete search history.

(56) References Cited

U.S. PATENT DOCUMENTS 4,617,838 A * 10/1986 Anderson ............... F16H 13/08
                                                            475/195
4,951,517 A    8/1990 Azuma et al.
(Continued)

FOREIGN PATENT DOCUMENTS

EP    2687752       1/2014
JP    S57186740   * 11/1982
(Continued)

OTHER PUBLICATIONS

European Search Report for Application No. 20773638.0, dated Oct. 12, 2022, (9 pages).
(Continued)

*Primary Examiner* — Derek D Knight
(74) *Attorney, Agent, or Firm* — Hartman Global IP Law; Gary M. Hartman; Domenica N. S. Hartman

(57) ABSTRACT

The frictional roller reducer has an input shaft, an output shaft, a pair of annular roller elements, a plurality of planetary rollers, a carrier, a pressing device, and a controller. The pressing device rotationally drives a cam disk by a pressing force adjusting motor, which causes an annular roller element of the pair of annular roller elements to displace in the axial direction. The controller, by adjusting the rotational drive of the pressing force adjusting motor, adjusts the surface pressure at the traction portions between rolling surfaces of the planetary rollers and an inner-diameter side rolling contact surface of the input shaft and outer-diameter side rolling contact surfaces of the pair of annular roller elements to a target value.

7 Claims, 6 Drawing Sheets

(56) References Cited

U.S. PATENT DOCUMENTS

| | | | | |
|---|---|---|---|---|
| 10,161,489 B2 * | 12/2018 | Fujita | ................... | F16H 13/06 |
| 2018/0238402 A1 * | 8/2018 | Saito | ................... | F16D 28/00 |

FOREIGN PATENT DOCUMENTS

| | | | |
|---|---|---|---|
| JP | S57186740 U | | 11/1982 |
| JP | 1-116366 | | 5/1989 |
| JP | 06229450 | | 8/1994 |
| JP | 11063130 | | 3/1999 |
| JP | 2012207778 | | 10/2012 |
| JP | 2014169726 | | 9/2014 |
| JP | 2015206389 | | 11/2015 |
| JP | 2015206389 A | * | 11/2015 |
| JP | 2016031075 | | 3/2016 |
| JP | 2016223468 | | 12/2016 |
| JP | 2017-44236 | | 3/2017 |
| JP | 2017129197 | | 7/2017 |
| WO | 2005106272 | | 11/2005 |

OTHER PUBLICATIONS

International Search Report, dated Mar. 17, 2020, for International Application No. PCT/JP2020/000683, (12 pages).

Microfilm of the Specification and Drawings Annexed to the Request of Japanese Utility Model Application No. 24322/1978 (Laid-Open No. 127077/1979) (Mitsubishi Heavy Industries, Ltd.), Apr. 9, 1979, Fig. 2-4., (25 pages).

Microfilm of the Specification and Drawings Annexed to the Request of Japanese Utility Model Application No. 74111/1981 (Laid-Open No. 186740/1982) (Mitsubishi Heavy Industries, Ltd.), Nov. 26, 1982, p. 1, Line 16 to p. 6, Line 7, Fig. 1-2., (16 pages).

\* cited by examiner

FRICTIONAL ROLLER REDUCER

CROSS REFERENCE TO RELATED APPLICATIONS

This application claims the benefit of PCT/JP2020/000683 filed Jan. 10, 2020, having a priority claim to Japanese Patent Application No. 2019-053690 filed Mar. 20, 2019. The contents of these prior patent documents are incorporated herein by reference.

TECHNICAL FIELD

The present invention relates to a frictional roller reducer that is incorporated, for example, in a drive system of an electric vehicle for transmitting torque to drive wheels after reducing the rotation (increasing the torque) of an electric motor.

BACKGROUND ART

In an electric vehicle, in order to improve the efficiency of the electric motor that is the drive source and increase the distance that can be traveled per charge, the rotation of the output shaft of a small electric motor is transmitted to the drive wheels after being decelerated by a reducer. As such a reducer, a frictional roller type reducer can be used.

FIG. 6 illustrates a frictional roller reducer described in JP 2012-207778A. The frictional roller reducer 100 includes a housing 101, an input shaft 102, an output shaft 103, a sun roller 104, an annular roller 105, a plurality of planetary rollers 106, and a pair of pressing devices 107.

The input shaft 102 and the output shaft 103 are supported inside the housing 101 coaxially with each other and capable of relative rotation.

The sun roller 104 is a combination of a pair of sun roller elements 108 having shapes symmetrical with respect to the axial direction. The pair of sun roller elements 108 are supported around the input shaft 102 being coaxial with the input shaft 102, and are able to rotate relative to the input shaft 102 in a state in which a gap is interposed between the tip-end surfaces that face each other. The pair of sun roller elements 108 have conical surface-shaped inner-diameter side rolling contact surfaces 109 on the outer circumferential surface, the outer diameter dimension of which increases as the distance from each other in the axial direction increases, and have driven side cam surfaces 110 on the base-end surfaces that each face the opposite side in the axial direction (facing the opposite side in the axial direction from the tip-end surface). The driven-side cam surfaces 110 are formed by arranging driven-side cam concave portions 111, the depth in the axial direction of which changes in the circumferential direction, at a plurality of locations equidistantly spaced in the circumferential direction.

The annular roller 105 is arranged around the sun roller 104 so as to be coaxial with the sun roller 104, and is connected by a connecting portion 112 having an L-shaped cross section to the output shaft 103 so as to be able to transmit torque. The annular roller 105 has a cylindrical shaped outer-diameter side rolling contact surface 113 on the inner circumferential surface.

Each of the planetary rollers 106 has a support shaft 114 that is arranged in parallel with the input shaft 102, and is supported by the housing 101 so as to be able to rotate (spin) around the support shaft 114 and to displace in the radial direction of the input shaft 102, and so as not to be able to rotate (revolve) around the input shaft 102. Each of the planetary rollers 106 has a rolling surface 115 having an arc-shaped generating line on the outer circumferential surface. The planetary rollers 106 are arranged at a plurality of locations in the circumferential direction of the annular space between the sun roller 104 and the annular roller 105, and causes the rolling surfaces 115 to come into rolling contact with the inner-diameter side rolling contact surfaces 109 of the pair of sun roller elements 108 and with the outer-diameter side rolling contact surface 113 of the annular roller 105.

The pair of pressing devices 107 include a loading cam type pressing device that presses the pair of sun roller elements 108 in directions approaching each other, and each of the pair of pressing devices 107 includes a cam disk 116 and a plurality of balls 117.

Each cam disk 116 is externally fitted and fixed to the input shaft 102 so as to be able to integrally rotate with the input shaft 102, and has a drive-side cam surface 118 on the side surface in the axial direction facing the driven-side cam surface 110 of the sun roller element 108. The drive-side cam surface 118 is formed by arranging drive-side cam concave portions 119, the depth in the axial direction of which changes in the circumferential direction, at a plurality of locations equidistantly spaced in the circumferential direction.

One ball 117 is held between each driven-side cam concave portion 111 of the driven-side cam surface 110 of the sun roller element 108 and each drive-side cam concave portion 119 of the drive-side cam surface 118 of the cam disk 116.

In the frictional roller reducer 100, when torque is inputted to the input shaft 102, each of the balls 117 of the pair of pressing devices 107 rides up on the shallow portion of the depth in the axial direction of the driven-side cam concave portion 111 and the drive-side cam concave portion 119. As a result, when the dimension in the axial direction of the pair of pressing devices 107 increases and the pair of sun roller elements 108 are pressed in directions approaching each other, the outer-diameter dimension of the portions of the inner-diameter side rolling contact surfaces 109 that come in rolling contact with the rolling surfaces 115 of the planetary rollers 106 becomes larger. As a result, the surface pressure at the traction portions (rolling contact portions) between the inner-diameter side rolling contact surfaces 109 of the sun roller elements 108 and the rolling surfaces 115 of the planetary rollers 106 increases. Furthermore, when the planetary rollers 106 are pushed outward in the radial direction of the input shaft 102 as the surface pressure increases, the surface pressure at the traction portions between the rolling surfaces 115 of the planetary rollers 106 and the outer-diameter side rolling contact surface 113 of the annular roller 105 also increases. As a result, torque that is inputted to the pair of sun roller elements 108 from the input shaft 102 via the pair of pressing devices 107 can be transmitted to the annular roller 105 via the planetary rollers 106 and obtained from the output shaft 103 without causing excessive slipping at each of the traction portions.

In the frictional roller reducer 100 as described above, when the torque that is applied to the input shaft 102 increases, the amount that the balls 117 of the pair of pressing devices 107 ride up from the bottom portions of the driven-side cam concave portions 111 and drive-side cam concave portions 119 increases, and the dimension in the axial direction of the pair of pressing devices 107 increases even more. As a result, the surface pressure at the traction portions between the rolling surfaces 115 and the inner-diameter side rolling contact surfaces 109 and the outer-diameter side rolling contact surfaces 113 further increases, and large torque can be transmitted without the occurrence of excessive slipping at the traction portions. Therefore, by appropriately regulating the inclination angle (gradient angle), the dimension in the circumferential direction, and the like of the driven-side cam concave portions 111 and the drive-side cam concave portions 119, the surface pressure at the traction portions is automatically adjusted to an appropriate value according to the torque to be transmitted between the input shaft 102 and the output shaft 103, and specifically, to a value obtained by multiplying the minimum required value by an appropriate safety factor.

CITATION LIST

Patent Literature

Patent Literature 1: JP 2012-207778A
Patent Literature 2: JP 2016-223468A
Patent Literature 3: JP 2008-196657A

SUMMARY OF THE INVENTION

Technical Problem

However, in the case of the frictional roller reducer 100 described in JP 2012-207778A, loading cam type pressing devices are used as the pressing devices 107 that press the pair of sun roller elements 108 in directions toward each other, and thus there is a possibility that problems such as those described below may occur. In other words, at the traction portions between the rolling surfaces 115 and the inner-diameter side rolling contact surfaces 109 and the outer-diameter side rolling contact surfaces 113, the limit value (limit traction coefficient $\mu_{max}$) of the traction coefficient (=tangential force/normal force) at which torque can be transmitted without causing the occurrence of harmful slipping called gross slipping is also affected by parameters other than the torque to be transmitted between the input shaft 102 and the output shaft 103.

For example, the traction coefficient changes according to the temperature (oil temperature) of the traction oil that is supplied to the traction portions. More specifically, in a normal temperature environment (for example, in an environment of 0° C. or higher), the higher the oil temperature, the lower the viscosity of the traction oil, and thus the traction coefficient also decreases. On the other hand, as described in JP 2016-223468A, it is known that in an extremely low temperature environment (for example, in an environment of less than 0° C.), as the oil temperature decreases, the viscosity of the traction oil increases, but the traction coefficient decreases.

Moreover, JP 2008-196657A describes that the traction coefficient is influenced by and changes due to a slip rate S ($=(U_1-U_2)/U_1$), which represents a delay of the peripheral speed $U_2$ of the driven side rotating body with respect to the peripheral speed $U_1$ of the driving side rotating body.

Regardless of the influence of parameters other than the torque that is to be transmitted between the input shaft 102 and the output shaft 103, such as the oil temperature of the traction oil and the peripheral speed at the traction portions, setting a high safety factor for the traction coefficient in order to transmit torque from the sun roller 104 to the annular roller 105 without causing gross slipping to occur at each of the traction portions is effective. However, in a case where the safety factor for the traction coefficient is excessively increased and the surface pressure at each traction portion becomes excessive, the rolling resistance, for example, will increase unnecessarily, the transmission loss will increase, and the transmission efficiency of the frictional roller reducer 100 will decrease.

In view of the circumstances described above, it is an object of the present invention to provide a frictional roller reducer having a structure capable of ensuring excellent transmission efficiency while preventing the occurrence of gross slip at the traction portions.

Solution to Problem

The frictional roller reducer of the present invention includes an input shaft, an inner-diameter side rolling contact surface, an output shaft, a pair of annular roller elements, a plurality of planetary rollers, a carrier, a pressing device, and a controller.

The input shaft is supported by a housing, for example, so as to be able to rotate freely.

The inner-diameter side rolling contact surface is configured by an outer circumferential surface of the input shaft, or by an outer circumferential surface of a portion that integrally rotates with the input shaft, for example, the outer circumferential surface of a sun roller or the like that is supported by and fixed to the input shaft.

The output shaft is coaxial with the input shaft and supported so as to be able to rotate relative to the input shaft.

The pair of annular roller elements are prevented from rotating around the input shaft and are arranged with a gap between tip-end surfaces facing each other.

The inner circumferential surface of each of the pair of annular roller elements is configured by an outer-diameter side rolling contact surface that faces the inner-diameter side rolling contact surface, and is inclined in a direction in which an inner diameter dimension increases as going toward the tip-end surface side.

At least one annular roller element of the pair of annular roller elements is supported so as to be able to displace in an axial direction, and has a driven side cam surface on a base end surface facing toward an opposite side in the axial direction from the tip-end surface.

Each of the plurality of planetary rollers has a rotation shaft arranged parallel to the input shaft, and a rolling surface that comes in rolling contact with the inner-diameter side rolling contact surface and the outer-diameter side rolling contact surfaces.

The carrier supports the plurality of planetary rollers so at to be able to rotate freely around the rotation shaft and to be able to displace in a radial direction, and is integrally configured with the output shaft or configured by a member that integrally rotates with the output shaft.

The pressing device includes a cam disk, a plurality of rolling bodies, and a pressing force adjusting motor. The cam disk is supported around the input shaft so as to be able to rotate relative to the input shaft and so as not to be able to displace in the axial direction, and has a drive side cam surface on a side surface in the axial direction that faces the driven side cam surface. The plurality of rolling bodies is held between the driven side cam surface and the drive side cam surface.

The pressing force adjusting motor rotationally drives the cam disk. Based on rotational driving of the cam disk by the pressing force adjusting motor, the pressing device is able to press the pair of annular roller elements in directions approaching each other.

The controller, by adjusting the rotational drive of the pressing force adjusting motor, is able to adjust surface pressure at traction portions (rolling contact portions) between the rolling surfaces and the inner-diameter side rolling contact surface and the outer-diameter side rolling contact surface to a target value.

The frictional roller reducer of the present invention can include a temperature sensor that measures the temperature of traction oil supplied to the traction portions. In this case, the controller can use the temperature of the traction oil measured by the temperature sensor to calculate the target value.

The frictional roller reducer of the present invention can include a rotational speed sensor that measures rotational speed of the output shaft. In this case, the controller can use the rotational speed of the output shaft measured by the rotational speed sensor to calculate the target value.

The pressing device can include a reducer having a drive-side gear that is rotationally driven by the pressing force adjusting motor, and a driven-side gear that meshes with the drive-side gear and integrally rotates with the cam disk. In this case, the drive-side gear is a worm, and the driven-side gear is a worm wheel. In other words, the reducer can be configured by a worm reducer. In a case where the reducer is a worm reducer, preferably the reducer has a self-locking function that does not transmit the rotation of the worm wheel to the worm.

The controller, by adjusting the rotational drive of the pressing force adjusting motor, is able to make the surface pressure at the rolling contact portions between the rolling surfaces and the inner-diameter side rolling contact surface substantially zero.

In this case, the frictional roller reducer of the present invention can include a planetary roller pressing means that elastically presses the planetary rollers outward in the radial direction. The frictional roller reducer of the present invention can additionally or alternatively include a roller element pressing means that elastically presses the pair of annular roller elements in directions away from each other in the axial direction.

Effect of Invention

The frictional roller reducer of the present invention, by adjusting the amount and direction of rotation of the pressing force adjusting motor, is able to adjust the surface pressure at the traction portions to an arbitrary value, and thus it is possible to ensure good transmission efficiency while preventing the occurrence of gross slipping at the traction portions.

DESCRIPTION OF EMBODIMENTS

First Example

Figure 1:
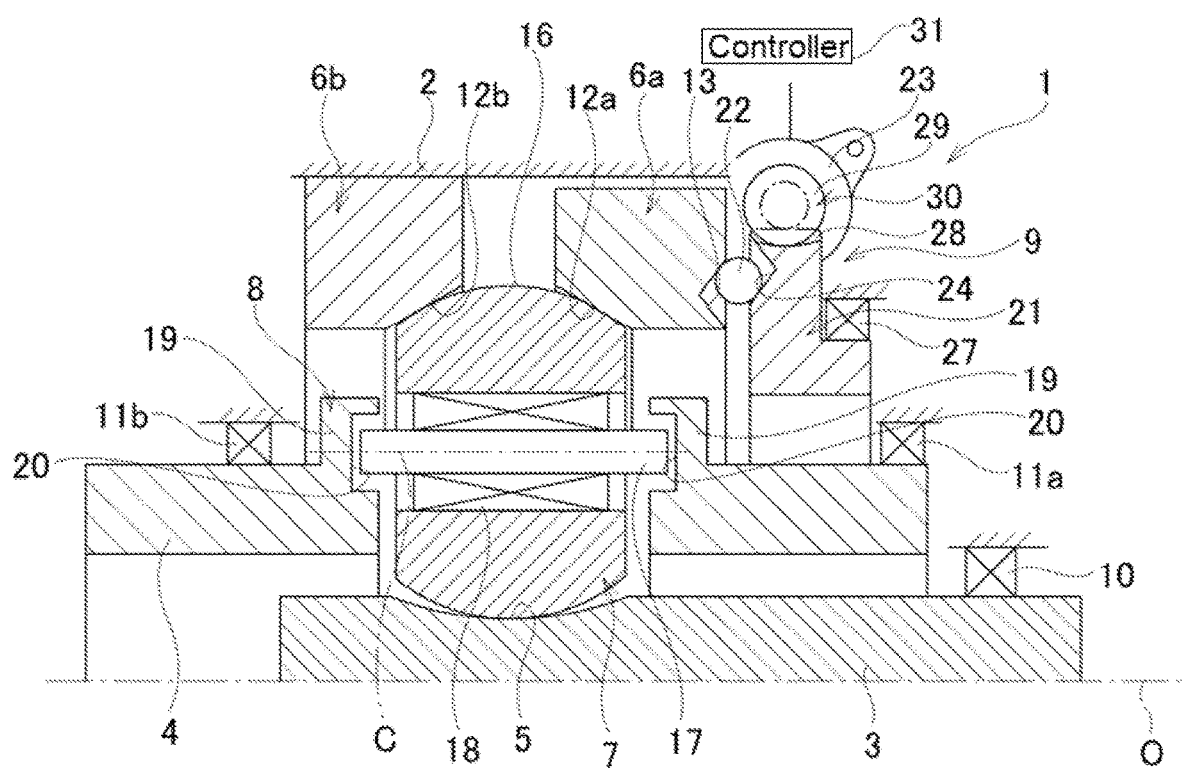
FIG. 1 is a schematic view illustrating a frictional roller reducer of a first example of an embodiment of the present invention in a state during normal running.

FIG. 1 to FIG. 3C illustrate a first example of an embodiment of the present invention. A frictional roller reducer 1 of this example includes a housing 2, an input shaft 3, an output shaft 4, an inner-diameter side rolling contact surface 5, a pair of annular roller elements 6a, 6b, a plurality of planetary rollers 7, a carrier 8, a pressing device 9, and a controller 31.

The input shaft 3 is supported by a motor output shaft of an electric motor, which is a drive source of an electric vehicle, so as to be able to rotate coaxially and integrally with the motor output shaft. The input shaft 3 is rotatably supported inside the housing 2 by a bearing device 10.

The output shaft 4 is supported coaxially with the input shaft 3 so as to be able to rotate relative to the input shaft 3. In this example, the output shaft 4 is a circular tubular hollow shaft, is arranged around the input shaft 3 so as to be coaxial with the input shaft 3, and is rotatably supported inside the housing 2 by a pair of bearings 11a, 11b. Each of the pair of bearings 11a, 11b includes, for example, an angular contact ball bearing or a tapered roller bearing in which contact angles in different directions to each other are given to the rolling bodies.

The inner-diameter side rolling contact surface 5 is directly formed by the outer circumferential surface of the tip-end portion of the input shaft 3. Note that the inner-diameter side rolling contact surface 5 may be formed by the outer circumferential surface of a sun roller that is supported by and fixed to the input shaft 3. In any case, the inner-diameter side rolling contact surface 5 rotates integrally with the input shaft 3 when the input shaft 3 is rotated by being rotationally driven by the electric motor. Moreover, in this example, the inner-diameter side rolling contact surface 5 is formed by a concave curved surface having a single arc-shaped generating line. However, the inner-diameter side rolling contact surface 5 may be formed by a simple cylindrical surface.

The pair of annular roller elements 6a, 6b are supported inside the housing 2 in a state around the input shaft 3 and coaxial with the input shaft 3 and prevented from rotating around the input shaft 3, with a gap being interposed between the tip-end surfaces facing each other. The pair of annular roller elements 6a, 6b have conical surface shaped outer-diameter side rolling contact surfaces 12a, 12b, respectively on the inner circumferential surface of the tip-end portions that face the inner-diameter side rolling contact surface 5 and that are inclined in a direction such that the inner diameter dimension becomes larger as going toward the tip-end sides (in directions toward each other).

Of the pair of annular roller elements 6a, 6b, one of the annular roller elements 6a (right side in FIGS. 1 and 2) is supported by the housing 2 so that relative rotation is not possible and so as to be able to displace in the axial direction. The annular roller element 6a has a driven side cam surface 13 on a base-end surface (right side surface in FIGS. 1 and 2) facing toward the opposite side in the axial direction from the tip-end surface. The driven side cam surface 13 is configured by arranging driven-side cam concave portions 15 that have a depth in the axial direction that is deepest at the bottom portion 14 and that becomes shallower going toward one side in the circumferential direction (upper side in FIGS. 3A to 3C) at a plurality of locations in the circumferential direction.

Of the pair of annular roller elements 6a, 6b, the other annular roller elements 6b (left side in FIGS. 1 and 2) is supported by the housing 2 so that relative rotation is not possible and so as not to be able to displace in the axial direction. The annular roller element 6b can also be configured by a part of the housing 2.

Each of the plurality of planetary rollers 7 has a rotation axis C arranged in parallel with the input shaft 3 so as to be able to displace in the radial direction of the input shaft 3, and has a rolling surface 16 on the outer circumferential surface that comes in rolling contact with the inner-diameter side rolling contact surface 5 and the outer-diameter side rolling contact surfaces 12a, 12b. In this example, the rolling surface 16 is configured by a convex curved surface having a single arc-shaped generating line with a radius of curvature smaller than the radius of curvature of the generating line of the inner-diameter side rolling contact surface 5. Therefore, the rolling surface 16 makes rolling contact with the inner-diameter side rolling contact surface 5 at an intermediate portion in the axial direction, and also makes rolling contact with the outer-diameter side rolling contact surfaces 12a, 12b at both end portions in the axial direction.

In this example, each of the planetary rollers 7 is rotatably supported by a bearing device 18 around a column-shaped support shaft 17 that is arranged coaxially with the rotation axis C. The support shaft 17 is freely supported at both ends in the axial direction by the carrier 8 so as to displace freely in the radial direction of the input shaft 3.

During operation of the frictional roller reducer 1, traction oil is continuously supplied from a nozzle (not illustrated), to traction portions (rolling contact portions) between the rolling surfaces 16 of the planetary rollers 7 and the inner-diameter side rolling contact surface 5 of the input shaft 3 and the outer-diameter side rolling contact surfaces 12a, 12b of the pair of annular roller elements 6a, 6b.

The carrier 8 supports each of the planetary rollers 7 so as to freely rotate about the rotation axis C and so as to be able to displace in the radial direction of the input shaft 3. In this example, the carrier 8 is integrally configured with the output shaft 4. However, the carrier 8 may be configured by a member separate from the output shaft 4, and may be coupled and fixed to the output shaft 4. In any case, as the carrier 8 rotates, the output shaft 4 also integrally rotates.

The carrier 8 includes a pair of annular portions 19 that protrude toward the outside in the radial direction from the outer circumferential surface of the output shaft 4, and are arranged at intervals in the axial direction. Each of the pair of annular portions 19 includes concave portions 20 having oval-shaped openings at a plurality of locations in the circumferential direction of the inner side surfaces that face each other. The concave portions 20 are formed on the inner side surfaces of the annular portions 19 so that the major axis is directed in the radial direction centered on the input shaft 3 (center axis O). Moreover, the concave portions 20 have a minor axis dimension that is slightly larger than the outer-diameter dimension of the support shaft 17. In this example, by arranging (engaging) both end portions in the axial direction of the support shaft 17 of each of the planetary rollers 7 on the inner side of the concave portions 20 so that there is no looseness in the circumferential direction around the input shaft 3, the planetary rollers 7 are supported so as to be able to displace in the radial direction of the input shaft 3.

Each of the planetary rollers 7 is configured so that by being supported around the support shaft 17 via a bearing device 18, the planetary roller 7 is able to freely rotate around the rotation axis C. However, by externally fitting and fastening the planetary roller 7 directly around the support shaft 17, or by integrally forming the support shaft 17 and the planetary roller 7, and arranging (engaging) both end portions in the axial direction of the support shaft 17 on the inner side of the concave portions 20 so as to be able to rotate freely via bearings as necessary, it is also possible to allow the planetary roller 7 to rotate about the rotation axis C.

Moreover, in this example, by arranging (engaging) both end portions of the support shaft 17 on the inner side of the concave portions 20 so as to be able to displace in the lengthwise direction of the concave portions 20, each of the planetary rollers 7 is able to displace in the radial direction of the input shaft 3. However, by supporting each of the planetary rollers 7 by the carrier 8 using a pivoting frame having a pair of support plate portions, the planetary roller 7 is able to displace in the radial direction of the input shaft 3. In this case, both end portions in the axial direction of the support shaft 17 are supported on the inner side surfaces of the pair of support plate portions facing each other, and the pivoting frame is supported by the carrier 8 so as to be able to pivot around a pivot shaft that is eccentric with respect to the support shaft 17.

The pressing device 9 has a function of bringing the pair of annular roller elements 6a, 6b closer to each other in the axial direction, and includes a cam disk 21, a plurality of rolling bodies 22, and a pressing force adjusting motor 23.

The cam disk 21 is supported around the input shaft 3 coaxially with the input shaft 3 so as to be able to rotate relative to the input shaft 3 and the output shaft 4 and so as not to be able to displace in the axial direction, and has a drive-side cam surface 24 on a side surface in the axial direction (left side surface in FIGS. 1 and 2) facing the driven-side cam surface 13 of the annular roller element 6a. The drive-side cam surface 24 is configured by arranging drive-side cam concave portions 26, which have a depth in the axial direction that is deepest at the bottom portion 25 and that becomes shallower as going toward the other side in the circumferential direction (lower side in FIGS. 3A to 3C), at a plurality of locations in the circumferential direction.

In this example, the cam disk 21 is rotatably supported on the inner side of the housing 2 by a bearing 27, and has a driven-side gear 28 on the outer circumferential surface. In this example, the driven-side gear 28 is configured by a helical gear (worm wheel) having a tooth trace that is inclined with respect to the axial direction.

Each of the plurality of rolling bodies 22 is held between the driven-side cam concave portion 15 of the driven-side cam surface 13 and the drive-side cam concave portion 26 of the drive-side cam surface 24. Each of the rolling bodies 22 is configured by a ball or a column-shaped roller.

In this example, the pressing device 9, by causing the rolling bodies 22 to ride up on the shallow side from the bottom portion 25 of the drive-side cam concave portion 26 and from the bottom portion 14 of the driven-side cam concave portion 15 due to the rotational drive of the cam disk 21, and causing the annular roller element 6a to displace in the axial direction, is able to press the pair of annular roller elements 6a, 6b in directions toward each other.

The pressing force adjusting motor 23 rotationally drives the cam disk 21. Therefore, in this example, the drive-side gear 29 that meshes with the driven-side gear 28 of the cam disk 21 is supported by and fixed to the motor output shaft of the pressing force adjusting motor 23. In this example, the drive-side gear 29 is configured by a worm having a screw-shaped tooth trace. In other words, in this example, the cam disk 21 is configured to be rotationally drivable by the pressing force adjusting motor 23 via a worm reducer 30 including the driven-side gear 28 and the drive-side gear 29. In this example, the lead angle of the drive-side gear 29, which is a worm, is reduced so that the worm reducer 30 has a self-locking function.

Note that the driven-side gear 28 and the drive-side gear 29 can both be spur gears or bevel gears. Alternatively, configuration may be such that a pulley is supported and fixed to the motor output shaft of the pressing force adjusting motor 23, and by a continuous belt spanning between the pulley and the outer circumferential surface of the cam disk 21, the cam disk 21 can be rotationally driven by the pressing force adjusting motor 23.

The pressing force adjusting motor 23 is configured by an electric motor capable of positioning control such as a stepping motor, a DC motor, or the like.

A controller 31 has a function of adjusting surface pressure at traction portions between the rolling surfaces 16 of the planetary rollers 7 and the inner-diameter side rolling contact surface 5 of the input shaft 3 and the outer-diameter side rolling contact surfaces 12a, 12b of the pair of annular roller elements 6a, 6b to target values by adjusting the rotational drive of the pressing force adjusting motor 23, and specifically, by adjusting the amount of rotation and the direction of rotation.

In other words, the controller 31 causes the annular roller element 6a to displace in the axial direction by adjusting the amount of rotation and the direction of rotation of the pressing force adjusting motor 23, adjusting the amount of rotation and direction of rotation of the cam disk 21, and adjusting the ride-up amount $d_1$ of the rolling bodies 22 riding up from the bottom portion 25 of the drive-side cam concave portion 26 and the ride-up amount $d_2$ of the rolling bodies 22 riding up from the bottom portion 14 of the driven-side cam concave portion 15. When the outer-diameter dimension of the portion of the outer-diameter side rolling contact surfaces 12a, 12b of the pair of annular roller elements 6a, 6b that come in rolling contact with the rolling surfaces 16 of the planetary rollers 7 changes due to displacement in the axial direction of the annular roller element 6a, the planetary rollers 7 displace in the radial direction of the input shaft 3. As a result, the surface pressure at the traction portions between the rolling surfaces 16 of the planetary rollers 7 and the inner-diameter side rolling contact surface 5 of the input shaft 3 and outer-diameter side rolling contact surfaces 12a, 12b of the pair of annular roller elements 6a, 6b is adjusted to a desired value.

More specifically, as illustrated from FIGS. 3A to 3B, the annular roller element 6a is caused to displace in a direction toward the annular roller element 6b (left direction in FIG. 1 and FIG. 2) by rotationally driving the cam disk 21 in a specified direction (upward in FIG. 3A and FIG. 3B) and increasing the ride-up amount $d_1$ of the rolling bodies 22 riding up from the bottom portion 25 of the drive-side cam concave portion 26 and the ride-up amount $d_2$ of the rolling bodies 22 riding up from the bottom portion 14 of the driven-side cam concave portion 15. As a result, when the outer-diameter dimension of the portion of the outer-diameter side rolling contact surfaces 12a, 12b of the pair of annular roller elements 6a, 6b that makes rolling contact with the rolling surfaces 16 of the planetary rollers 7 becomes smaller, the planetary rollers 7 displace inward (downward in FIGS. 1 and 2) in the radial direction of the input shaft 3. As a result, the surface pressure at the traction portions between the rolling surfaces 16 of the planetary rollers 7 and the inner-diameter side rolling contact surface 5 of the input shaft 3 and outer-diameter side rolling contact surfaces 12a, 12b of the pair of annular roller elements 6a, 6b increases.

On the other hand, as illustrated from FIGS. 3B to FIG. 3A, when the cam disk 21 is rotationally driven in a direction opposite to a specified direction (downward in FIGS. 3A and 3B), the planetary rollers 7 displace outward in the radial direction of the input shaft 3 (upward in FIG. 1 and FIG. 2), the annular roller element 6a displaces in a direction away from the annular roller element 6b (toward the right in FIG. 1 and FIG. 2), and the ride-up amount $d_1$ of riding up from the bottom portion 25 of the drive-side cam concave portion 26 and the ride-up amount $d_2$ of riding up from the bottom portion 14 of the driven-side cam concave portion 15 of the rolling body 22 decreases. Note that a centrifugal force acts on the planetary rollers 7 due to the rotation (revolution) of the planetary rollers 7 about the input shaft 3, and based on this centrifugal force, an outward force is applied in the radial direction of the input shaft 3 to the outer-diameter side rolling contact surfaces 12a, 12b from the rolling surfaces 16. The outer-diameter side rolling contact surfaces 12a, 12b are conical surfaces, and thus when the outward force is applied from the rolling surfaces 16 to the outer-diameter side rolling contact surfaces 12a, 12b in the radial direction of the input shaft 3, a component force acts on the annular roller element 6a in a direction away from the annular roller element 6b (toward the right in FIGS. 1 and 2). Therefore, in a case where the cam disk 21 is rotationally driven in a direction opposite to a specified direction, the planetary rollers 7 displace outward in the radial direction of the input shaft 3 due to a centrifugal force accompanying the revolution. At this time, the annular roller element 6a displaces in a direction away from the annular roller element 6b while reducing the ride-up amount $d_1$ of riding up from the bottom portion 25 of the drive-side cam concave portion 26 and the ride-up amount $d_2$ of riding up from the bottom portion 14 of the driven-side cam concave portion 15 of the rolling body 22. Accordingly, the planetary rollers 7 are allowed to displace outward in the radial direction of the input shaft 3 and the outer-diameter dimension of the portion of the outer-diameter side rolling contact surfaces 12a, 12b of the pair of annular roller elements 6a, 6b that comes in rolling contact with the rolling surfaces 16 of the planetary rollers 7 increases. As a result, the surface pressure at the traction portions between the rolling surfaces 16 of the planetary rollers 7 and the inner-diameter side rolling contact surface 5 of the input shaft 3 and outer-diameter side rolling contact surfaces 12a, 12b of the pair of annular roller elements 6a, 6b decreases.

In this example, the controller 31 is configured so as to set a target value for the surface pressure at each traction portion in consideration of the torque (transmission torque) transmitted between the input shaft 3 and output shaft 4, as well as other parameters other than the transmission torque such as the traction oil temperature (oil temperature), the rotational speed of the input shaft 3, output shaft 4 and/or the planetary rollers 7, and the like. In order for this, the relation between parameters including the transmission torque and the appropriate value of the surface pressure at the traction portions according to the parameters, or in other words, a value obtained by multiplying the minimum required value by the appropriate safety factor, is found in advance by experimentation, simulation, or the like, and stored in memory of the controller 31 as a map, a calculation formula, or the like.

When the frictional roller reducer 1 is in operation, parameters such as the transmission torque and oil temperature are measured by various sensors (not illustrated), and the output values of these sensors are inputted to the controller 31. The controller 31 finds an appropriate value (target value) for the surface pressure at the traction portions according to the output values of various sensors based on a map, a calculation formula, or the like stored in the memory. In order to adjust the surface pressure at the traction portions to the target value found in this way, the controller 31 adjusts the rotation direction and the amount of rotation of the pressing force adjusting motor 23 to adjust the position in the axial direction of the annular roller element 6a.

The output torque of the electric motor can be used as the transmission torque of the input parameters to be inputted to the map or the calculation formula. Alternatively, the transmission torque may be found by measuring the rotational torque of the input shaft 3 or the output shaft 4 with a torque sensor. As the torque sensor, it is possible to use, for example, a magnetostrictive torque sensor arranged around the input shaft 3 or the output shaft 4, or a pulse phase difference type torque sensor in which encoders are supported at two positions separated from each other in the axial direction of the input shaft 3 or the output shaft 4, and magnetic detection elements are made to face each of the encoders.

The oil temperature is measured by a temperature sensor installed at an arbitrary position in the traction oil circulation path, such as near a nozzle that sprays traction oil toward a traction portion.

The rotational speed of the input shaft 3, the output shaft 4 and/or the planetary rollers 7 can be measured, for example, by a rotational speed sensor in which a magnetic detection element is made to face an encoder that is supported by and fixed to the input shaft 3, the output shaft 4 and/or the planetary rollers 7. Note that in a case where the rotational speeds of the input shaft 3, the output shaft 4, and the planetary rollers 7 are measured independently, the amount of slipping at each traction portion can be obtained, which is preferable.

Figure 2:
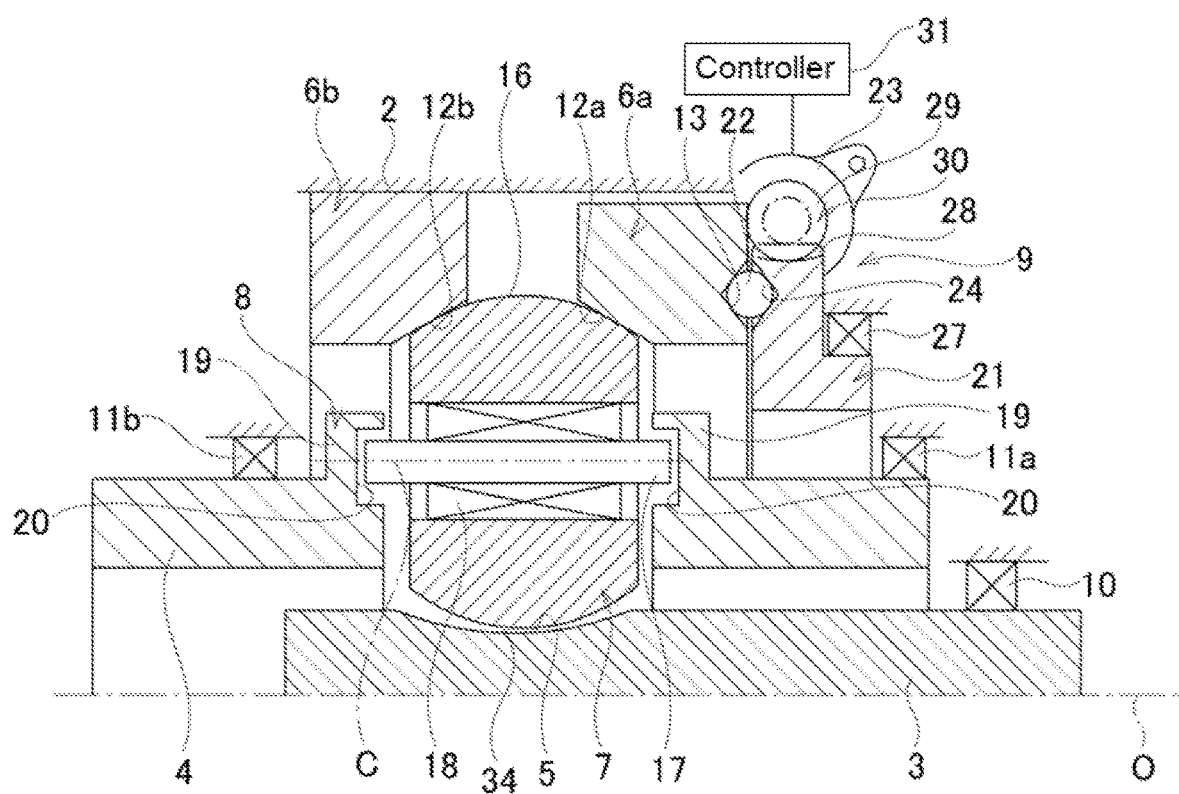
FIG. 2 is a schematic view illustrating the frictional roller reducer of the first example in a state during coasting.
Figure 3:
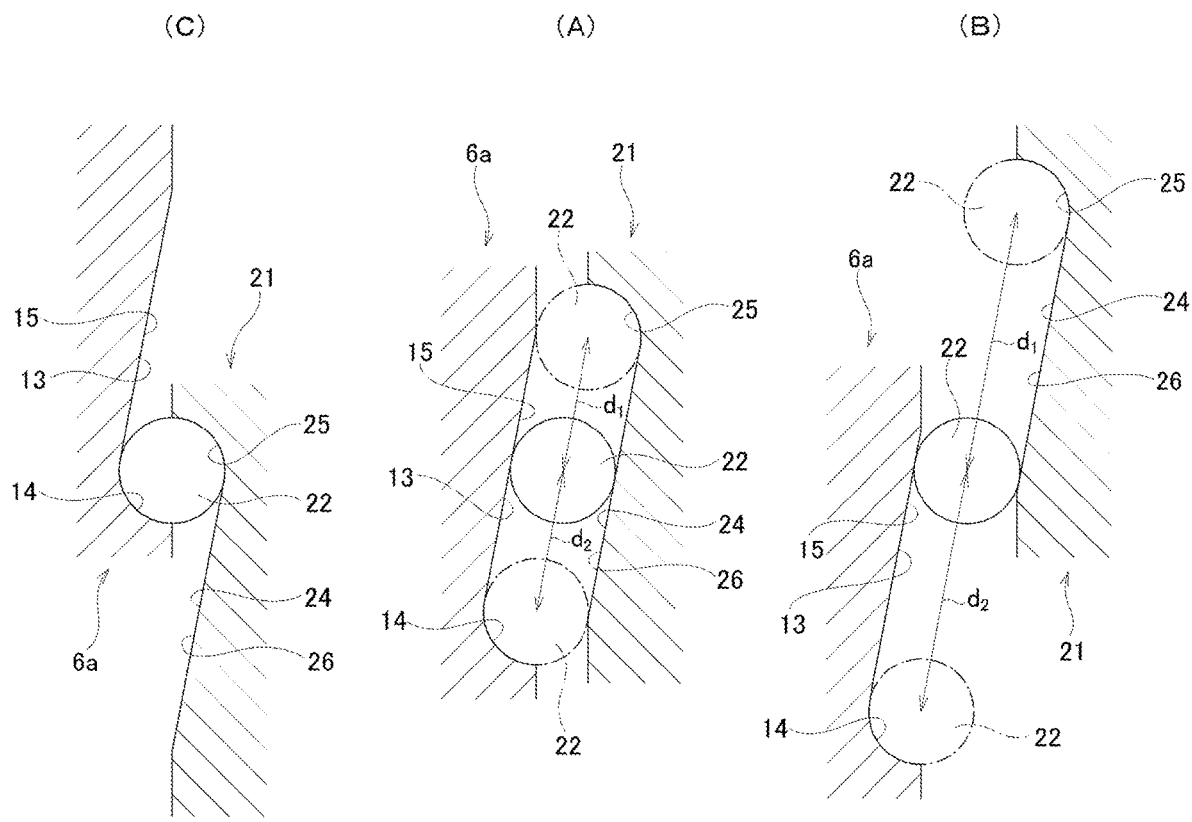
FIG. 3A is a schematic view illustrating a state in which a rolling body is located in an intermediate portion in the circumferential direction of a drive-side cam concave portion and a driven-side cam concave portion.
FIG. 3B is a schematic view illustrating a state in which a rolling body has moved from the position illustrated in FIG. 3A to the side of the drive-side cam concave portion and driven-side cam concave portion having a higher height in the axial direction.
FIG. 3C is a schematic view illustrating a state in which a rolling body is located at the bottom portion of the drive-side cam concave portion and the bottom portion of the driven-side cam concave portion.

In this example, the controller 31 has a function of making the surface pressure at the traction portions between the inner-diameter side rolling contact surface 5 of the input shaft 3 and the rolling surfaces 16 of the planetary rollers 7 substantially zero by adjusting the rotational drive of the pressing force adjusting motor 23. Therefore, for example, it is possible to cause the output shaft 4 to idle with respect to the input shaft 3 during coasting. In other words, during coasting, the output shaft 4 rotates due to rotation of the wheels, and the planetary rollers 7 rotate (revolve) around the input shaft 3. Therefore, a centrifugal force based on the revolution acts on the planetary rollers 7. In this state, when the controller 31 rotationally drives the cam disk 21 in a direction opposite to a specified direction by the pressing force adjusting motor 23 via the worm reducer 30, the planetary rollers 7 displace outward in the radial direction while the annular roller element 6a is caused to displace in a direction away from the annular roller element 6b due to the action of centrifugal force. As a result, as illustrated in FIG. 3C, the rolling bodies 22 move to the bottom portion 14 of the driven-side cam concave portion 15 and to the bottom portion 25 of the drive-side cam concave portion 26, and as illustrated in FIG. 2, the rolling surfaces 16 of the planetary rollers 7 are separated from the inner-diameter side rolling contact surface 5 of the input shaft 3, a gap 34 occurs between the rolling surfaces 16 and the inner-diameter side rolling contact surface 5, and the output shaft 4 is able to idle with respect to the input shaft 3.

In the frictional roller reducer 1 of this example, the magnitude of the pressing force generated by the pressing device 9 can be adjusted to an arbitrary value by adjusting the rotational drive amount of the pressing force adjusting motor 23, and therefore it is possible to adjust the surface pressure at the traction portions between the rolling surface 16 and the inner-diameter side rolling contact surface 5 and the outer-diameter side rolling contact surfaces 12a,12b to an arbitrary value. More specifically, the surface pressure at the traction portions can be adjust to an appropriate value in consideration of the torque that is transmitted between the input shaft 3 and the output shaft 4, as well as parameters other than the transmission torque such as the traction oil temperature (oil temperature), rotational speed (rpm) of the input shaft 3, the output shaft 4 and/or the planetary rollers 7, or the like. Therefore, it is possible to prevent the occurrence of gross slip at each traction portion without excessively increasing the safety factor for the traction coefficient, and it is possible to ensure good transmission efficiency of the frictional roller reducer 1.

Note that in this example, the relation between conditions such as transmission torque, oil temperature, and the like and the target value of the surface pressure at the traction portions according to the conditions is found by performing experimentation and simulation in advance. Therefore, it is considered that not only the parameters directly measured by various sensors, but also the elastic deformation of each member under the parameters, the slippage at the traction portions, the influence of the skew of the planetary rollers 7 and the like can be taken into consideration. However, it is also possible to measure the inclination of the rotation axis C of the planetary rollers 7 with a displacement sensor and use the output value of the displacement sensor to calculate the target value of the surface pressure at the traction portions. In other words, it is possible to measure the inclination of the rotation axis C by abutting the tip-end portion of a measuring element (probe) of a displacement sensor at two positions on the side surfaces in the axial direction of the planetary roller 7, preferably at two positions on opposite sides in the radial direction.

Moreover, in this example, the worm reducer 30 has a self-locking function, and therefore even in a case where the pressing force adjusting motor 23 is stopped after adjusting the surface pressure at the traction portions to the target value, it is possible to maintain the position in the axial direction of the annular roller element 6a.

Furthermore, the controller 31 of the frictional roller reducer 1 of this example has a function of making the surface pressure at the traction portions between the inner-diameter side rolling contact surface 5 of the input shaft 3 and the rolling surfaces 16 of the planetary rollers 7 substantially zero. Therefore, by activating this function when the accelerator is OFF, such as during high-speed cruising or the like, the traveling distance due to coasting can be lengthened. In other words, in a case where the surface pressure at the traction portions between the inner-diameter side rolling contact surface 5 and the rolling surfaces 16 is substantially set to zero during coasting, the output shaft 4 rotates as the wheels rotate, and the planetary rollers 7 rotate (revolve) around the input shaft 3. Due to the action of centrifugal force based on the revolution of the planetary rollers 7, the planetary rollers 7 displace outward in the radial direction while the annular roller element 6a is displaced in a direction away from the annular roller element 6b, and the rolling surfaces 16 of the planetary rollers 7 are separated from the inner-diameter side rolling contact surface 5 of the input shaft 3, and gaps 34 are formed between the rolling surfaces 16 and the inner-diameter side rolling contact surface 5. As a result, the output shaft 4 is able to idle with respect to the input shaft 3, and therefore the rotational resistance of the wheels can be kept low during coasting, and it is possible to improve the electric cost performance of the electric vehicle equipped with the frictional roller reducer 1.

Second Example

Figure 4:
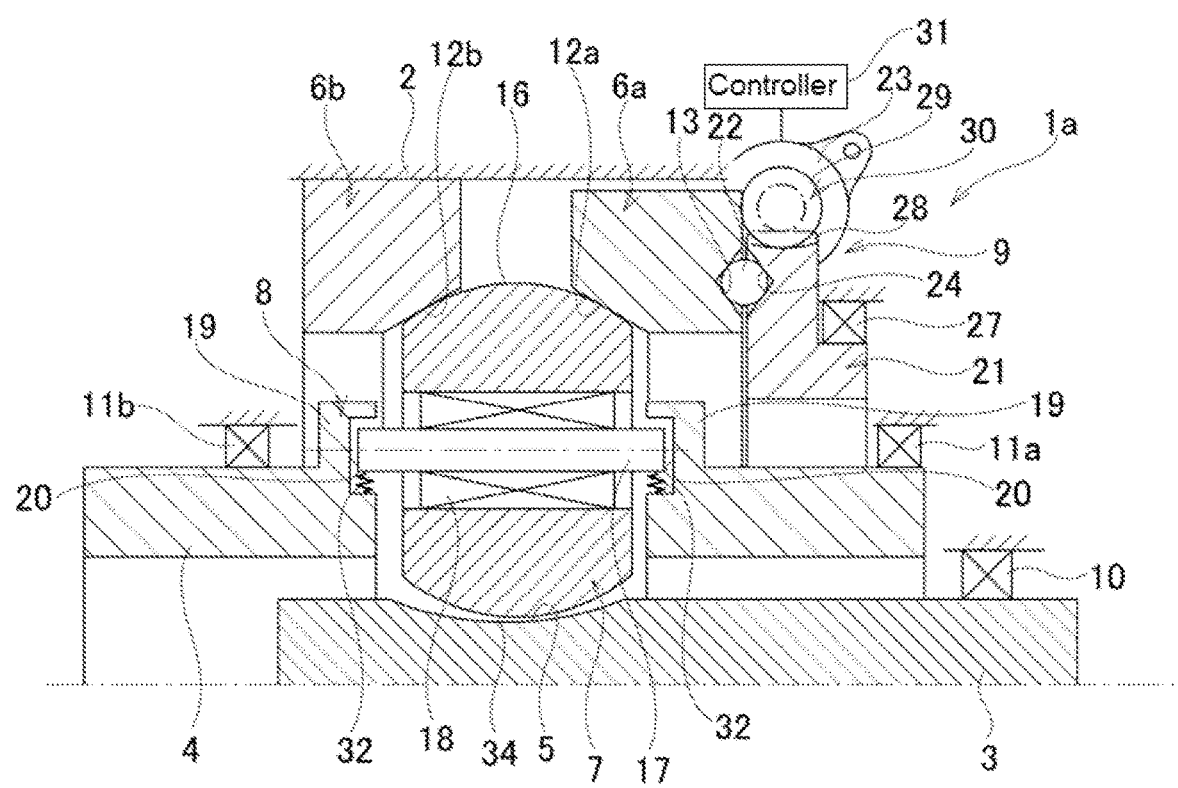
FIG. 4 is a diagram similar to FIG. 2 illustrating a frictional roller reducer of a second example of an embodiment of the present invention.

FIG. 4 illustrates a second example of an embodiment of the present invention. The frictional roller reducer 1a of this example further includes planetary roller pressing means 32 that elastically press the planetary rollers 7 outward in the radial direction of the input shaft 3. The planetary roller pressing means 32 of this example is configured by holding elastic members such as compression coil springs in an elastically compressed state between the end portions on the inner side in the radial direction of the input shaft 3 of the concave portions 20 and both end portions in the axial direction of the support shaft 17.

With the frictional roller reducer 1a of this example, in a case where the surface pressure at the traction portions between the inner-diameter side rolling contact surface 5 and the rolling surfaces 16 is substantially zero during coasting, the rolling surfaces 16 of the planetary rollers 7 can be reliably separated from the inner-diameter side rolling contact surface 5 of the input shaft 3.

In the frictional roller reducer 1 of the first example, even in a case where the function of making the surface pressure at the traction portions between the inner-diameter side rolling contact surface 5 and the rolling surfaces 16 substantially zero is activated, and the rolling bodies 22 are moved to the bottom portion 14 of the driven-side cam concave portion 15 and the bottom portion 25 of the drive-side cam concave portion 26, there is a possibility that the output shaft 4 will not be able to idle with respect to the input shaft 3. In other words, in a case where the rotational speed of the output shaft 4 is slow, the centrifugal force applied to the planetary rollers 7 is small and the component force in the axial direction acting on the annular roller element 6a is small, and thus there is a possibility that the annular roller element 6a will not be displaced in a direction away from the annular roller element 6b, and the rolling surfaces 16 may not be separated from the inner-diameter side rolling contact surface 5.

On the other hand, with the frictional roller reducer 1a of this example, the planetary roller pressing means 32 elastically presses the planetary rollers 7 outward in the radial direction of the input shaft 3, and thus in a case where the function of making the surface pressure at the traction portions between the inner-diameter side rolling contact surface 5 and the rolling surfaces 16 substantially zero is activated, the rolling surfaces 16 can be easily separated from the inner-diameter side rolling contact surface 5 regardless of the rotational speed of the output shaft 4. The configuration and operational effect of other parts are the same as in the first example.

Third Example

Figure 5:
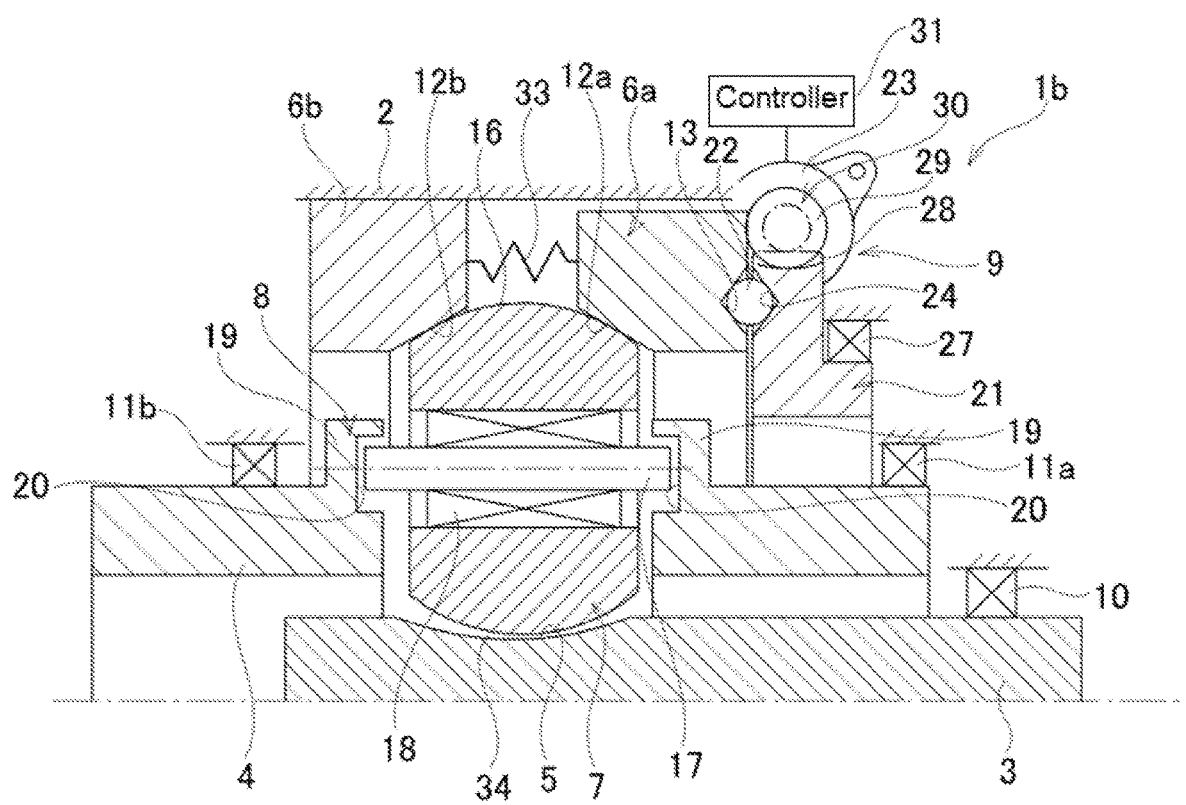
FIG. 5 is a diagram similar to FIG. 2 illustrating a frictional roller reducer of a third example of an embodiment of the present invention.
Figure 6:
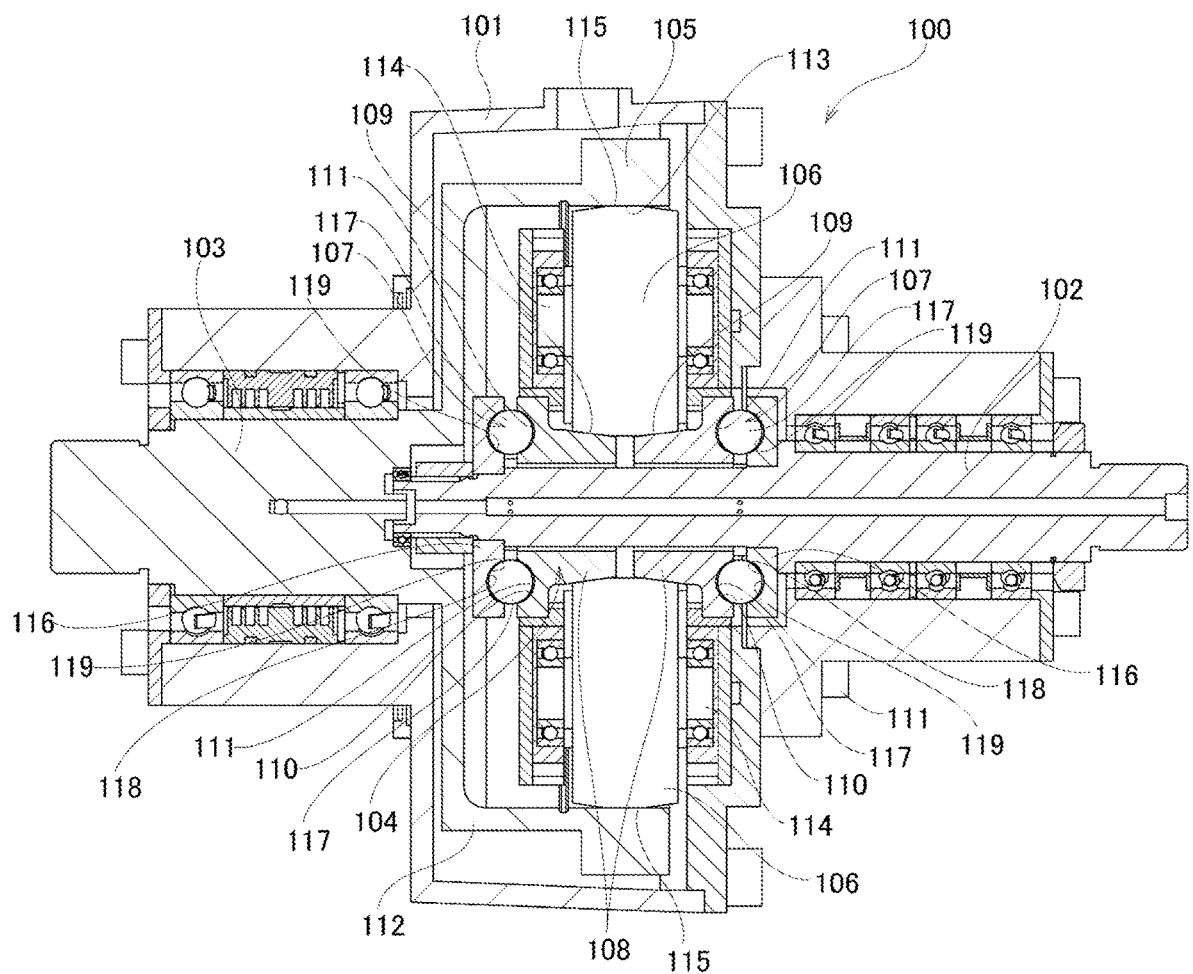
FIG. 6 is a cross-sectional view illustrating an example of a conventional structure of a frictional roller reducer.

FIG. 5 illustrates a third example of an embodiment of the present invention. The frictional roller reducer 1b of this example further includes a roller element pressing means 33 that elastically presses the annular roller element 6a in a direction away from the annular roller element 6b. The roller element pressing means 33 of this example is configured by holding an elastic member such as a compression coil spring between the tip-end surfaces of the pair of annular roller elements 6a, 6b in an elastically compressed state.

With the frictional roller reducer 1b of this example, in a case where the surface pressure at the traction portions between the inner-diameter side rolling contact surface 5 and the rolling surfaces 16 is substantially zero during coasting, the rolling surfaces 16 of the planetary rollers 7 can be easily separated from the inner-diameter side rolling contact surface 5 of the input shaft 3. The structure of this example can be implemented in combination with the structure of the second example. In other words, the frictional roller reducer of the present invention can simultaneously include both planetary roller pressing means 32 and roller element pressing means 33. The configuration and operational effect of other parts are the same as in the first example and second example.

REFERENCE SIGNS LIST 1, 1a, 1b Frictional roller reducer
2 Housing
3 Input shaft
4 Output shaft
5 Inner-diameter side rolling contact surface
6a, 6b Annular roller element
7 Planetary roller
8 Carrier
9 Pressing device
10 Bearing device
11a, 11b Bearing
12a, 12b Outer-diameter side rolling contact surface
13 Driven-side cam surface
14 Bottom portion
15 Driven-side cam concave portion
16 Rolling surface
17 Support shaft
18 Bearing device
19 Annular portion
20 Concave portion
21 Cam disk
22 Rolling body
23 Pressing force adjusting motor
24 Drive-side cam surface
25 Bottom portion
26 Drive-side cam concave portion
27 Bearing
28 Driven-side gear
29 Drive-side gear
30 Worm reducer
31 Controller
32 Planetary roller pressing means
33 Roller element pressing means
34 Gap
100 Frictional roller reducer 101 Housing
102 Input shaft
103 Output shaft
104 Sun roller
105 Annular roller
106 Planetary roller
107 Pressing device
108 Sun roller element
109 Inner-diameter side rolling contact surface
110 Driven-side cam surface
111 Driven-side cam concave portion
112 Connecting portion
113 Outer-diameter side rolling contact surface
114 Support shaft
115 Rolling surface
116 Cam disk
117 Ball
118 Drive-side cam surface
119 Drive-side cam concave portion

The invention claimed is:

1. A frictional roller reducer, comprising:
an input shaft;
an inner-diameter side rolling contact surface configured by an outer circumferential surface of the input shaft, or by an outer circumferential surface of a portion that integrally rotates with the input shaft;
an output shaft that is coaxial with the input shaft and supported so as to be able to rotate relative to the input shaft;
a pair of annular roller elements that are prevented from rotating around the input shaft and are arranged with a gap between tip-end surfaces thereof facing each other; where an inner circumferential surface of each of the pair of annular roller elements is configured by an outer-diameter side rolling contact surface that faces the inner-diameter side rolling contact surface, and is inclined in a direction in which an inner diameter dimension increases as going toward a tip-end surface side thereof, and at least one annular roller element of the pair of annular roller elements is supported so as to be able to displace in an axial direction, and has a driven-side cam surface on a base end surface facing toward an opposite side in the axial direction from the tip-end surface thereof;
a plurality of planetary rollers, each having a rotation shaft arranged parallel to the input shaft, and a rolling surface that comes in rolling contact with the inner-diameter side rolling contact surface and the outer-diameter side rolling contact surfaces;
a carrier that supports the plurality of planetary rollers so at to be able to rotate freely around the rotation shaft and to be able to displace in a radial direction, and integrally configured with the output shaft or configured by a member that integrally rotates with the output shaft;
a pressing device that includes:
a cam disk that is supported around the input shaft so as to be able to rotate relative to the input shaft and so as not to be able to displace in the axial direction, having a drive side cam surface on a side surface in the axial direction that faces the driven side cam surface;
a plurality of rolling bodies held between the driven side cam surface and the drive side cam surface; and
a pressing force adjusting motor that rotationally drives the cam disk; and
based on rotational driving in a specified direction of the cam disk by the pressing force adjusting motor, is able to press the pair of annular roller elements in directions toward each other; and
a controller that, by adjusting a rotational drive of the pressing force adjusting motor, is able to adjust surface pressure at traction portions between the rolling surfaces and the inner-diameter side rolling contact surface and the outer-diameter side rolling contact surfaces to a target value;
wherein the controller, by adjusting the rotational drive of the pressing force adjusting motor so as to rotationally drive the cam disk in a direction opposite to the specified direction during coasting, displacing the planetary rollers outward in the radial direction due to centrifugal force while the pair of annual roller elements is caused to displace in a direction away from each other, is able to make a surface pressure at the rolling contact portions between the rolling surfaces and the inner-diameter side rolling contact surface substantially zero.

2. The frictional roller reducer according to claim 1, wherein
a temperature sensor that measures temperature of traction oil supplied to the traction portions is provided; and
the controller uses the temperature of the traction oil measured by the temperature sensor to calculate the target value.

3. The frictional roller reducer according to claim 1, wherein
a rotational speed sensor that measures rotational speed of the output shaft is provided; and
the controller uses the rotational speed of the output shaft measured by the rotational speed sensor to calculate the target value.

4. The frictional roller reducer according to claim 1, wherein
the pressing device comprises a reducer having a drive-side gear that is rotationally driven by the pressing force adjusting motor, and a driven-side gear that meshes with the drive-side gear and integrally rotates with the cam disk.

5. The frictional roller reducer according to claim 4, wherein
the drive-side gear is a worm, and the driven-side gear is a worm wheel.

6. The frictional roller reducer according to claim 1, wherein
a planetary roller pressing means that elastically presses the planetary rollers outward in the radial direction is provided.

7. The frictional roller reducer according to claim 1, wherein
a roller element pressing means that elastically presses the pair of annular roller elements in directions away from each other in the axial direction is provided.

* * * * *